United States Patent
Amarasinghe et al.

(10) Patent No.: US 9,988,985 B2
(45) Date of Patent: Jun. 5, 2018

(54) MOUNT FOR RIGID RAFT FOR A GAS TURBINE ENGINE WITH TETHERS

(71) Applicant: ROLLS-ROYCE PLC, London (GB)

(72) Inventors: Ashan Amarasinghe, Rotherham (GB); Michael Christopher Willmot, Sheffield (GB)

(73) Assignee: ROLLS-ROYCE plc, London (GB)

( * ) Notice: Subject to any disclaimer, the term of this patent is extended or adjusted under 35 U.S.C. 154(b) by 803 days.

(21) Appl. No.: 14/230,339

(22) Filed: Mar. 31, 2014

(65) Prior Publication Data

US 2014/0305134 A1    Oct. 16, 2014

(30) Foreign Application Priority Data

Apr. 12, 2013 (GB) .................................. 1306674.1

(51) Int. Cl.
| | |
|---|---|
| F02C 7/32 | (2006.01) |
| H02G 3/00 | (2006.01) |
| H02G 3/04 | (2006.01) |
| B64D 27/00 | (2006.01) |
| F02C 7/00 | (2006.01) |
| F02C 9/00 | (2006.01) |

(52) U.S. Cl.
CPC ............... *F02C 7/00* (2013.01); *F02C 7/32* (2013.01); *B64D 27/00* (2013.01); *F02C 9/00* (2013.01); *F05D 2300/43* (2013.01); *F05D 2300/603* (2013.01); *H02G 3/00* (2013.01); *H02G 3/04* (2013.01); *Y02T 50/672* (2013.01)

(58) Field of Classification Search
CPC .... H02G 3/00; H02G 3/04; F02C 7/32; B64D 27/00

USPC ...................................................... 244/134 D
See application file for complete search history.

(56) References Cited

U.S. PATENT DOCUMENTS

| | | | | | |
|---|---|---|---|---|---|
| 2,274,087 | A | * | 2/1942 | Morten | ..................... H02G 3/00 174/88 R |
| 2,393,635 | A | * | 1/1946 | Hubbard | .............. B64D 15/166 244/134 A |
| 2,963,538 | A | * | 12/1960 | Dahlgren | ................. H01B 7/08 156/309.6 |
| 3,086,071 | A | * | 4/1963 | Preston | ..................... H01B 7/08 156/333 |

(Continued)

FOREIGN PATENT DOCUMENTS

| | | |
|---|---|---|
| EP | 2 279 852 A1 | 2/2011 |
| EP | 2 607 662 A2 | 6/2013 |
| FR | 2 972 129 A1 | 9/2012 |

OTHER PUBLICATIONS

Mar. 17, 2015 European Search Report issued in European Application No. 14 16 2568.

(Continued)

*Primary Examiner* — Lorne Meade
*Assistant Examiner* — Eric Linderman
(74) *Attorney, Agent, or Firm* — Oliff PLC

(57) ABSTRACT

A rigid raft is provided for a gas turbine engine. The raft has an electrical system and/or a fluid system embedded in the material of the raft. The raft further has one or more first mounts for mounting the raft to the gas turbine engine, and one or more second mounts for mounting a gas turbine engine component to the raft. The raft further has one or more tethers which extend between respective first and second mounts and are embedded in the material of the raft.

10 Claims, 6 Drawing Sheets

(56) References Cited

U.S. PATENT DOCUMENTS

| | | | | |
|---|---|---|---|---|
| 3,128,214 A * | 4/1964 | Lay | | H01B 7/0045 156/56 |
| 3,168,617 A * | 2/1965 | Richter | | H01B 7/0838 156/47 |
| 3,494,657 A * | 2/1970 | Harper | | B62D 21/17 105/422 |
| 3,612,744 A * | 10/1971 | Thomas | | H01B 11/20 174/117 FF |
| 3,700,825 A * | 10/1972 | Taplin | | H01B 7/08 174/113 R |
| 3,710,568 A * | 1/1973 | Rice | | F02C 7/32 439/191 |
| 3,806,628 A * | 4/1974 | Higgins | | H01B 7/009 174/112 |
| 3,866,016 A * | 2/1975 | Tombu | | B05C 7/02 219/213 |
| 4,458,863 A * | 7/1984 | Smith | | B64D 27/00 239/265.29 |
| 5,004,639 A * | 4/1991 | Desai | | B32B 7/02 174/254 |
| 5,007,853 A * | 4/1991 | Olsen | | H02G 3/00 439/209 |
| 5,016,934 A * | 5/1991 | Pelz | | H02G 3/281 296/214 |
| 5,022,612 A * | 6/1991 | Berson | | B64D 15/163 244/134 A |
| 5,048,747 A * | 9/1991 | Clark | | H05K 3/3484 228/180.21 |
| 5,054,715 A * | 10/1991 | Hager | | B64D 27/00 244/54 |
| 5,097,390 A * | 3/1992 | Gerrie | | H05K 3/4691 174/255 |
| 5,098,037 A * | 3/1992 | Leffel | | B64D 15/166 244/134 A |
| 5,141,447 A * | 8/1992 | Poirier | | H01R 25/162 439/207 |
| 5,142,448 A * | 8/1992 | Kober | | H05K 3/4691 174/254 |
| 5,174,110 A * | 12/1992 | Duesler | | F02C 7/32 138/111 |
| 5,524,847 A * | 6/1996 | Brodell | | B64C 7/02 244/54 |
| 5,657,952 A * | 8/1997 | Goldberg | | B64D 15/163 244/134 D |
| 5,675,473 A * | 10/1997 | McDunn | | H05K 9/0037 165/80.4 |
| 5,746,391 A * | 5/1998 | Rodgers | | B64D 27/18 244/54 |
| 5,895,889 A * | 4/1999 | Uchida | | B60R 16/0207 174/72 A |
| 5,921,500 A * | 7/1999 | Ellis | | B64D 27/20 244/54 |
| 5,927,644 A * | 7/1999 | Ellis | | B64D 27/26 244/54 |
| 6,299,469 B1 * | 10/2001 | Glovatsky | | F02D 9/02 439/329 |
| 6,330,995 B1 * | 12/2001 | Mangeiga | | B64D 27/26 244/54 |
| 6,338,455 B1 * | 1/2002 | Rauch | | B64D 15/12 244/134 D |
| 6,344,616 B1 * | 2/2002 | Yokokawa | | H01B 7/00 174/117 F |
| 6,357,220 B1 * | 3/2002 | Snyder | | F02C 7/32 60/223 |
| 6,401,448 B1 * | 6/2002 | Manteiga | | B64D 27/26 244/54 |
| 6,474,597 B1 * | 11/2002 | Cazenave | | B64D 27/18 244/54 |
| 6,481,101 B2 * | 11/2002 | Reichinger | | B60R 16/0207 156/289 |
| 6,689,446 B2 * | 2/2004 | Barnes | | B60R 16/0215 156/292 |
| 6,969,807 B1 * | 11/2005 | Lin | | H01B 7/0861 174/117 F |
| 7,232,091 B2 * | 6/2007 | Marche | | B64D 27/26 244/54 |
| 7,232,315 B2 * | 6/2007 | Uchida | | H01R 12/721 439/492 |
| 7,513,458 B2 * | 4/2009 | Layland | | B64D 15/12 244/134 D |
| 7,525,816 B2 * | 4/2009 | Sawachi | | H05K 1/0212 174/250 |
| 7,745,730 B2 * | 6/2010 | Bailey | | H01B 7/0838 174/117 F |
| 7,837,497 B1 * | 11/2010 | Matsuo | | H01R 12/62 439/492 |
| 7,967,242 B2 * | 6/2011 | Combes | | B64D 27/12 244/54 |
| 8,118,251 B2 * | 2/2012 | Suciu | | B64D 27/18 244/54 |
| 8,205,825 B2 * | 6/2012 | Huggins | | B64D 27/26 244/54 |
| 8,215,580 B2 * | 7/2012 | Balk | | B64D 27/26 244/54 |
| 8,226,028 B2 * | 7/2012 | Marche | | B64D 27/12 244/54 |
| 8,640,987 B2 * | 2/2014 | Journade | | B64D 27/18 244/54 |
| 8,672,260 B2 * | 3/2014 | Penda | | B64D 27/20 244/54 |
| 8,727,269 B2 * | 5/2014 | Stuart | | F02C 7/20 244/53 R |
| 8,937,254 B2 * | 1/2015 | Wen | | B64C 3/185 174/113 R |
| 8,985,508 B2 * | 3/2015 | Caruel | | B64D 27/26 244/54 |
| 9,027,884 B2 * | 5/2015 | Valleroy | | B64D 33/02 244/134 D |
| 9,027,902 B2 * | 5/2015 | Schmidt | | F01D 25/285 248/671 |
| 9,114,882 B2 * | 8/2015 | Robertson, Jr. | | B64D 27/26 |
| 9,259,808 B2 * | 2/2016 | Broughton | | B23P 6/005 |
| 9,338,830 B2 * | 5/2016 | Broughton | | H05B 3/28 |
| 9,472,872 B2 * | 10/2016 | Broughton | | H01R 12/585 |
| 9,550,340 B2 * | 1/2017 | Olivier | | B29B 11/16 |
| 9,814,101 B2 * | 11/2017 | Broughton | | F24H 1/105 |
| 9,818,503 B2 * | 11/2017 | Broughton | | H01B 7/0045 |
| 2002/0046870 A1 * | 4/2002 | Zein | | H01B 7/0869 174/117 F |
| 2002/0170740 A1 * | 11/2002 | Yamanobe | | H01B 7/0838 174/117 F |
| 2003/0155467 A1 * | 8/2003 | Petrenko | | A63C 1/30 244/134 R |
| 2005/0012402 A1 * | 1/2005 | Mistry | | G06F 1/26 307/147 |
| 2005/0257956 A1 * | 11/2005 | Marshall | | B29C 35/0272 174/260 |
| 2006/0278423 A1 * | 12/2006 | Ichikawa | | B60R 16/0215 174/72 A |
| 2007/0017226 A1 * | 1/2007 | Butt | | F02C 7/32 60/772 |
| 2007/0029454 A1 | 2/2007 | Suttie et al. | | |
| 2007/0129902 A1 * | 6/2007 | Orbell | | B64D 37/02 702/55 |
| 2007/0170312 A1 * | 7/2007 | Al-Khalil | | B64D 15/22 244/134 A |
| 2007/0234559 A1 * | 10/2007 | Tokuda | | B60K 7/0007 29/755 |
| 2008/0155915 A1 * | 7/2008 | Howe | | H02G 3/00 52/220.3 |
| 2008/0179448 A1 * | 7/2008 | Layland | | B64D 15/12 244/1 N |
| 2008/0185478 A1 * | 8/2008 | Dannenberg | | B64C 1/12 244/119 |
| 2009/0095842 A1 * | 4/2009 | Gaertner, II | | B64D 15/12 244/134 D |
| 2009/0134272 A1 * | 5/2009 | Vauchel | | B64D 15/12 244/54 |

(56) References Cited

U.S. PATENT DOCUMENTS

| | | | | |
|---|---|---|---|---|
| 2009/0242703 A1* | 10/2009 | Alexander | F02C 7/047 | 244/134 D |
| 2010/0038475 A1* | 2/2010 | Zecca | B64D 15/12 | 244/1 N |
| 2010/0071345 A1* | 3/2010 | Silver | F02K 3/00 | 60/269 |
| 2010/0111685 A1* | 5/2010 | Sjunnesson | F01D 5/3023 | 415/200 |
| 2010/0288882 A1* | 11/2010 | Olson | B64D 15/163 | 244/134 D |
| 2011/0011627 A1* | 1/2011 | Aspas Puertolas | H05K 1/142 | 174/251 |
| 2011/0016882 A1* | 1/2011 | Woelke | F02C 7/00 | 60/796 |
| 2011/0017879 A1* | 1/2011 | Woelke | F16L 3/085 | 248/69 |
| 2011/0111616 A1* | 5/2011 | Chang | H05K 1/141 | 439/329 |
| 2011/0120748 A1* | 5/2011 | Bailey | H01B 7/0838 | 174/117 F |
| 2012/0012710 A1* | 1/2012 | Yamaguchi | B64D 37/32 | 244/135 R |
| 2012/0103685 A1* | 5/2012 | Blanchard | H02G 3/0431 | 174/72 A |
| 2012/0149232 A1* | 6/2012 | Balzano | H01R 13/22 | 439/370 |
| 2012/0160957 A1* | 6/2012 | Gagne | B64D 27/00 | 244/54 |
| 2012/0298803 A1* | 11/2012 | English | B64D 15/12 | 244/134 D |
| 2012/0298804 A1* | 11/2012 | Lewis | B64D 15/12 | 244/134 D |
| 2013/0043342 A1* | 2/2013 | Nordin | B64C 3/20 | 244/1 A |
| 2013/0048344 A1* | 2/2013 | Lou | H05K 1/0237 | 174/251 |
| 2013/0111872 A1* | 5/2013 | Young | B60R 16/0207 | 60/39.091 |
| 2013/0111922 A1* | 5/2013 | Parry-Jones | F01D 25/00 | 60/784 |
| 2013/0111924 A1* | 5/2013 | Parry-Jones | F02C 7/00 | 60/796 |
| 2013/0112474 A1* | 5/2013 | Watkiss | H05K 1/02 | 174/72 A |
| 2013/0114220 A1* | 5/2013 | Broughton | H01R 12/585 | 361/752 |
| 2013/0114236 A1* | 5/2013 | Parry-Jones | H02G 3/32 | 361/826 |
| 2013/0115788 A1* | 5/2013 | Broughton | H01R 12/61 | 439/67 |
| 2013/0160291 A1* | 6/2013 | Broughton | F02C 7/32 | 29/888.021 |
| 2013/0160458 A1* | 6/2013 | Willmot | F02C 7/12 | 60/783 |
| 2013/0160459 A1* | 6/2013 | Thies | F02C 7/32 | 60/796 |
| 2013/0160464 A1* | 6/2013 | Maszczk | F02C 7/20 | 60/796 |
| 2013/0161093 A1* | 6/2013 | Broughton | F02C 7/32 | 174/72 A |
| 2013/0189868 A1* | 7/2013 | Fitt | H01R 13/518 | 439/272 |
| 2014/0176057 A1* | 6/2014 | Van Wiemeersch | H02J 7/0044 | 320/108 |
| 2014/0179132 A1* | 6/2014 | Byrne | H01R 25/162 | 439/92 |
| 2014/0208712 A1* | 7/2014 | Dowdell | A62C 3/16 | 60/39.091 |
| 2014/0208770 A1* | 7/2014 | Fitt | F16B 37/122 | 60/801 |
| 2014/0290271 A1* | 10/2014 | Dalton | F02C 7/32 | 60/801 |
| 2014/0299720 A1* | 10/2014 | Robrecht | H02G 3/00 | 248/72 |
| 2014/0305136 A1* | 10/2014 | Taylor | F02C 7/32 | 60/801 |
| 2014/0305697 A1* | 10/2014 | Hudson | H01R 7/0045 | 174/72 A |
| 2014/0325992 A1* | 11/2014 | Summerfield | F02C 7/32 | 60/796 |
| 2014/0325993 A1* | 11/2014 | Broughton | H01R 12/77 | 60/796 |
| 2014/0325994 A1* | 11/2014 | Dowdell | H01R 12/77 | 60/801 |
| 2014/0325995 A1* | 11/2014 | Zizzo | H05K 1/0298 | 60/801 |
| 2014/0326058 A1* | 11/2014 | Broughton | G01M 15/14 | 73/112.01 |
| 2014/0326715 A1* | 11/2014 | Zizzo | C08K 3/04 | 219/553 |
| 2014/0327299 A1* | 11/2014 | Broughton | F02C 7/00 | 307/9.1 |
| 2014/0328030 A1* | 11/2014 | Broughton | F02C 7/32 | 361/749 |
| 2014/0366555 A1* | 12/2014 | Beier | F02C 7/20 | 60/796 |
| 2014/0373555 A1* | 12/2014 | Beier | F02C 7/20 | 60/796 |
| 2015/0048202 A1* | 2/2015 | Takeuchi | F02C 7/25 | 244/54 |
| 2015/0321625 A1* | 11/2015 | Sato | H02G 3/04 | 174/72 A |
| 2015/0329211 A1* | 11/2015 | Calder | B64D 15/12 | 244/134 D |
| 2015/0342022 A1* | 11/2015 | Willmot | H05K 1/0201 | 174/250 |
| 2015/0345333 A1* | 12/2015 | Dubois | B64D 29/06 | 415/214.1 |
| 2016/0056578 A1* | 2/2016 | Taylor | H01R 13/648 | 439/535 |
| 2016/0057873 A1* | 2/2016 | Richardson | G01R 29/0835 | 324/627 |
| 2016/0069213 A1* | 3/2016 | Fitt | F01D 25/24 | 415/121.3 |
| 2016/0072210 A1* | 3/2016 | Armstrong | F02C 7/00 | 439/67 |
| 2016/0096288 A1* | 4/2016 | Dowdell | F02C 7/32 | 415/200 |
| 2016/0159485 A1* | 6/2016 | Le Garrec | B64D 15/12 | 244/134 D |
| 2016/0167602 A1* | 6/2016 | Iwata | H02G 3/04 | 174/74 R |
| 2016/0177840 A1* | 6/2016 | Robertson | F01D 21/045 | 60/796 |
| 2016/0179989 A1* | 6/2016 | Nakamura | B60R 16/0215 | 703/1 |

OTHER PUBLICATIONS

Search Report issued in British Application No. 1306674.1 dated Oct. 9, 2013.

* cited by examiner

MOUNT FOR RIGID RAFT FOR A GAS TURBINE ENGINE WITH TETHERS

CROSS-REFERENCE TO RELATED APPLICATIONS

This application is based upon and claims the benefit of priority from British Patent Application Number 1306674.1 filed 12 Apr. 2013, the entire contents of which are incorporated by reference.

BACKGROUND OF THE INVENTION

1. Field of the Disclosure

The present disclosure relates to a rigid raft for a gas turbine engine, and particularly to a rigid raft to which a gas turbine engine component can be mounted.

2. Description of the Related Art

A typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, is commonly transmitted along conductors. Conventionally, such conductors may be in the form of wires and/or cables which are assembled together in a harness. In such a conventional harness, each wire may be surrounded by an insulating sleeve, which may be braided or have a braided cover.

By way of example, FIG. 1 of the accompanying drawings shows a typical gas turbine engine including two conventional wiring harnesses 102, 104, each provided with a respective connector component 106, 108 for connection to circuitry, which may be for example accommodated within the airframe of an aircraft in which the engine is installed.

The harnesses 102, 104 are assembled from individual wires and cables which are held together over at least part of their lengths by suitable sleeving and/or braiding. Individual wires and cables, for example those indicated at 110, emerge from the sleeving or braiding to terminate at plug or socket connector components 112 for cooperation with complementary socket or plug connector components 114 on, or connected to, the respective electrical components.

Each conventional harness 102, 104 comprises a multitude of insulated wires and cables. This makes the conventional harness itself bulky, heavy and difficult to manipulate. The conventional harnesses occupy significant space within a gas turbine engine (for example within the nacelle of a gas turbine engine), and thus may compromise the design of the aircraft, for example the size and/or weight and/or shape of the nacelle.

Conventional harnesses comprise a large number of components, including various individual wires and/or bundles of wires, supporting components (such as brackets or cables) and electrical and/or mechanical connectors. This can make the assembly process complicated (and thus susceptible to errors) and/or time consuming. Disassembly of the conventional harnesses (for example removal of the conventional harnesses from a gas turbine engine during maintenance) may also be complicated and/or time consuming. Thus, in many maintenance (or repair or overhaul) procedures on a gas turbine engine, removal and subsequent refitting of the conventional electrical harness may account for a very significant portion of the operation time and/or account for a significant proportion of the potential assembly errors.

The electrical conductors in the conventional harnesses may be susceptible to mechanical damage. For example, mechanical damage may occur during installation (for example through accidental piercing of the protective sleeves/braiding) and/or during service (for example due to vibration). In order to reduce the likelihood of damage to the conductors in a conventional harness, the protective sleeves/braiding may need to be further reinforced, adding still further weight and reducing the ease with which they can be manipulated. Similarly, the exposed electrical connectors used to connect one conductor to another conductor or conductors to electrical units may be susceptible to damage and/or may add significant weight to the engine.

It is also necessary to mount various units and components on the gas turbine engine, and to ensure that these units/components remain attached in the event of a fire or overheat event. This requires still further dedicated brackets and/or fixings to be provided, thereby still further adding to the weight and/or complexity of the engine.

OBJECTS AND SUMMARY

In a first aspect, the present disclosure provides a rigid raft for a gas turbine engine, wherein:
  the raft has an electrical system and/or a fluid system embedded in the material of the raft;
  the raft has one or more first mounts for mounting the raft to the gas turbine engine, and one or more second mounts for mounting a gas turbine engine component to the raft; and
  the raft has one or more tethers which extend between respective first and second mounts and are embedded in the material of the raft.

For example, the raft may be an electrical rigid raft that includes an electrical system comprising electrical conductors embedded in the composite material. Transferring electrical signals using the embedded electrical system of the rigid raft can provide a number of advantages over transferring electrical signals using a conventional harness. For example, during assembly and in use, such rafts may provide greater protection to their electrical conductors than conventional harnesses. Further, the use of such rafts may significantly reduce the build and maintenance times of an engine, and/or reduce the possibility of errors occurring during such procedures. The rafts can also provide weight and size advantages over conventional harnesses. Similar advantages accrue when fluids are transferred using the embedded fluid system of the rigid raft. It will be appreciated that the term raft may be used herein simply to refer to a structure as described and/or claimed herein, and thus the terms raft and structure may be interchangeable.

The raft may be used to provide engine dressings, for example at least a part of an electrical and/or a fluid system to the engine, and thus may be referred to as a rigid dressing raft.

The raft may provide a stable, regular and convenient platform on which to mount the systems/component. The combination of the installed raft with component(s)/system(s) mounted thereon may be much more compact and/or straightforward to assemble and/or have a greatly reduced number of component parts, for example compared with the corresponding conventional electrical harness and/or fluid system and separately mounted components/systems.

In the event of a fire or overheat event, the raft desirably continues to support the weight of any engine components mounted to that raft. These components can include electrical units which can be any type of electronic control unit (such as an electronic engine controller or an engine health monitoring unit), an ignitor box, sensors, oil tanks, filters etc. If such components come loose, they might lead to further damage to themselves or other engine components. Fire or overheat events include those that apply flame to a restricted area of the raft, as well as those that engulf the raft with high temperature air. This latter scenario can be caused by a "burst duct" event in which hot air escapes from a damaged duct and fills a fire zone with high temperature air, or by a "combustion burn through" event in which combustion gasses escape through engine casings and fill a fire zone with high temperature air.

In particular, the raft may be formed of composite material. For example, a raft formed of rigid polymer matrix composite material (in which a polymer matrix may be reinforced with chopped or continuous fibre, such as layers of continuous fibre), can begin to lose its mechanical strength above approximately 120° C. However, by virtue of the tethers, even if the material of the raft loses its strength, a component mounted at the second mounts can remain tethered to the engine at the first mounts, and thereby can be prevented from coming loose. The tethers (in their unembedded state) need not be particularly stiff, as it can be sufficient that they limit movement of the component relative to the engine, rather than prevent it.

As the tethers are embedded within the raft, there is no risk that they can be left off during original build or maintenance. There is also a reduced risk of the tethers being damaged during service. Thus advantageously the tethers can be essentially "fitted and forgotten".

In a second aspect, the present disclosure provides a rigid raft assembly for a gas turbine engine, the assembly including: a rigid raft formed according to the first aspect; and a gas turbine engine component mounted to the raft at the second mounts.

In a third aspect, the present disclosure provides a gas turbine engine or gas turbine engine installation, having the rigid raft according to the first aspect or the raft assembly of the second aspect, and preferably having an electrical rigid raft according to the first aspect or an electrical raft assembly of the second aspect.

Further optional features will now be set out. These are applicable singly or in any combination with any aspect.

The tethers may have higher temperature resistance than the material of the raft.

The tethers may be metallic, metals generally being able to withstand high temperatures while providing a robust mechanical tie. However, non-metallic tethers may be used.

In their unembedded state, the tethers can be solid members (such as metal strips or rods) or flexible members (such as braids of metal wires).

The first and second mounts can be simple fixtures such as mounting brackets, or may be more complex fixtures such as anti-vibration mounts. The mounts may be at least partially embedded in the raft. In this way, joints between the tethers and the mounts can also be embedded in the raft.

In general, the use of one or more electrical rafts/electrical raft assemblies may significantly reduce build time of an engine. For example, use of electrical rafts/electrical raft assemblies may significantly reduce the part count involved in engine assembly compared with a conventional harness arrangement. The number and/or complexity of the operations required to assemble an engine (for example to assemble/install the electrical system (or network) and/or other peripheral components, which may be referred to in general as engine dressing) may be reduced. For example, rather than having to install/assemble a great number of wires and/or wiring looms together on the engine installation, it may only be necessary to attach a relatively small number of electrical rafts/electrical raft assemblies, which themselves may be straightforward to handle, position, secure and connect. Thus, use of electrical raft assemblies in a gas turbine installation may reduce assembly time and/or reduce the possibility of errors occurring during assembly.

Use of rafts or raft assemblies may provide significant advantages during maintenance, such as repair and overhaul. As discussed above, the electrical rafts may be particularly quick and straightforward to assemble. The same advantages discussed above in relation to assembly apply to disassembly/removal from the gas turbine engine. Thus, any repair/overhaul that requires removal of at least a part of the electrical harness may be simplified and/or speeded up through use of electrical rafts as at least a part of the electrical harness, for example compared with conventional harnesses. Use of electrical rafts (for example as part of one or more electrical raft assemblies) may allow maintenance procedures to be advantageously adapted. For example, some maintenance procedures may only require access to a certain portion of the gas turbine engine that only requires a part of the harness to be removed. It may be difficult and/or time consuming, or not even possible, to only remove the required part of a conventional harness from a gas turbine engine. However, it may be relatively straightforward to only remove the relevant electrical raft, for example by simply disconnecting it from the engine and any other electrical rafts/components to which it is connected. Decreasing maintenance times has the advantage of, for example, reducing out-of service times (for example off-wing times for engines that are used on aircraft).

The build/assembly times may be additionally or alternatively reduced by pre-assembling and/or pre-testing individual and/or combinations of electrical rafts and/or electrical raft assemblies prior to engine assembly. This may allow the electrical and/or mechanical operation of the electrical rafts to be proven before installation, thereby reducing/eliminating the testing required during engine installation.

The electrical rafts/electrical raft assemblies may be a particularly lightweight solution for transferring electrical signals around an engine. For example, an electrical raft may be lighter, for example significantly lighter, than a conventional harness required to transmit a given number of electrical signals. A plurality of conductors may be embedded in a single electrical raft, whereas in a conventional arrangement a large number of heavy, bulky wires, usually with insulating sleeves, would be required. The reduced weight may be particularly advantageous, for example, when used on gas turbine engines on aircraft.

Electrical rafts may be more easily packaged and/or more compact, for example than conventional harnesses. Indeed, as mentioned above, the electrical rafts can be made into a very wide range of shapes as desired. This may be achieved, for example, by manufacturing the electrical rafts using a mould conforming to the desired shape. As such, each electrical raft may be shaped, for example, to turn through a tighter corner (or smaller bend radius) than a conventional harness. The electrical rafts may thus provide a particularly compact solution for transferring electrical signals around a gas turbine engine. The electrical rafts may be readily shaped to conform to neighbouring components/regions of a gas turbine engine, for example components/regions to which the particular electrical raft assembly is attached, such as a fan casing or a core casing.

The electrical raft(s) may provide improved protection to the electrical conductors during manufacture/assembly of the raft/gas turbine installation, and/or during service/operation/maintenance of the gas turbine engine. This may result in lower maintenance costs, for example due to fewer damaged components requiring replacement/repair and/or due to the possibility of extending time intervals (or service intervals) between inspecting the electrical system, for example compared with a system using only conventional harnesses.

Any suitable material may be used for the rigid material of the electrical raft. For example, the rigid material may be a rigid composite material, such as an organic matrix composite. Such a rigid composite material may be particularly stiff and/or lightweight. Thus, a rigid composite raft may be used that has suitable mechanical properties, whilst being thin and lightweight, for example compared with some other materials. The rigid composite material may comprise any suitable combination of resin and fibre as desired for a particular application. For example, any of the resins and/or fibres described herein may be used to produce a rigid composite material for the electrical raft. Any suitable fibres may be used, for example carbon fibres, glass fibres, aramid fibres, and/or para-aramid fibres. The fibres may be of any type, such as woven and/or chopped. Any suitable resin may be used, for example epoxy, BMI (bismaleimide), PEEK (polyetheretherketone), PTFE (polytetraflouroethylene), PAEK (polyaryletherketone), polyurethane, and/or polyamides (such as nylon).

In any example of electrical raft or electrical raft assembly, at least one of the electrical conductors embedded in the electrical raft may be an electrically conductive wire. The or each electrically conductive wire may be surrounded by an electrically insulating sleeve.

At least some (for example a plurality) of the electrical conductors may be provided in a flexible printed circuit (FPC). Thus, at least some of the electrical conductors may be provided as electrically conductive tracks in a flexible substrate. The flexible printed circuit may be flexible before being embedded in the rigid material.

Providing the electrical conductors as tracks in a flexible printed circuit may allow the size of the resulting electrical raft to be reduced further and/or substantially minimized. For example, many different electrical conductors may be laid into a flexible printed circuit in close proximity, thereby providing a compact structure. The flexible substrate of a single flexible printed circuit may provide electrical and/or mechanical protection/isolation to a large number of electrical conductors.

Any given electrical raft may be provided with one or more electrical wires embedded therein (which may be sheathed) and/or one or more flexible printed circuits embedded therein. As such, a given electrical raft may have wires and flexible printed circuits laid therein.

It will be appreciated that the embedded electrical conductors (whether they are provided as embedded electrical wires or as conductive tracks in a flexible printed circuit embedded in the rigid material) may be described as being fixed in position by the rigid material, for example relative to the rest of the electrical harness raft. It will also be appreciated that the embedded electrical conductors may be said to be surrounded by the rigid material and/or buried in the rigid material and/or integral with (or integrated into) the rigid material.

The electrical raft (or electrical raft assembly) may be at least a part of an electrical harness for a gas turbine engine, and thus may be referred to herein as an electrical harness raft (or electrical harness raft assembly).

The raft may comprise a fluid passage. Indeed, an electrical raft (or electrical raft assembly) may also comprise a fluid passage. Such a fluid passage may be embedded therein and/or otherwise provided thereto. The fluid passage may be part of a fluid system, such as a gas (for example pneumatic or cooling gas/air) and/or liquid (for example a fuel, hydraulic and/or lubricant liquid).

There is also provided a method of assembling a raft assembly and/or a gas turbine engine. The method comprises preparing an raft assembly as described above and elsewhere herein. The method also comprises electrically and/or mechanically connecting the prepared raft assembly to the rest of the apparatus/gas turbine engine.

Thus, there is provided a gas turbine engine or gas turbine engine installation (for example for an airframe) comprising a raft or raft assembly (which may be an electrical raft and/or an electrical raft assembly) as described above and elsewhere herein. For example, at least one electrical raft and/or electrical raft assembly may be used as part of an electrical harness for transferring electrical signals around the engine, in the form of electrical harness raft(s) and/or electrical harness raft assemblies.

An electrical raft may comprise one or more electrical connectors or sockets, which may be electrically connected to at least one of the embedded electrical conductors. The electrical connector or socket may allow electrical connection of the electrical raft to other electrical components, for example to other electrical rafts (either directly or indirectly, via an electrical cable or lead) or to electrical units (again, either directly or indirectly, via an electrical cable or lead). Such an electrical connector or socket may take any suitable form, and may be at least partially embedded in the rigid electrical raft.

The electrical raft assembly may be a first engine installation component, and the gas turbine engine may further comprise a second engine installation component having electrical conductors. The gas turbine engine may further comprise at least one flexible cable connected between the electrical raft assembly and the second engine installation component so as to electrically connect electrical conductors of the electrical raft assembly with electrical conductors of the second engine installation component.

The second engine installation component may be, for example, an ECU, such as an EMU or EEC. Additionally or alternatively, the second engine installation component may be a further electrical raft or electrical raft assembly.

The environment of a gas turbine engine during operation may be particularly severe, with, for example, high levels of vibration and/or differential expansion between components as the temperature changes through operation and as the components move relative to each other. Providing at least one flexible cable to connect an electrical raft assembly to another component may allow the electrical rafts and/or components to accommodate vibration and/or relative movement, for example of the component(s)/assemblies to which they are attached/mounted during use. For example, the flexible cable(s) (where present) used to electrically connect electrical raft assemblies to other component(s) may have sufficient length to accommodate such vibration and/or movement during use.

For example, providing separate (for example more than one) electrical raft assemblies and connecting at least some (for example at least two) of them together using at least one flexible cable may allow the electrical rafts to accommodate vibration and/or relative movement of the component(s)/assemblies to which they are attached/mounted during use.

The electrical signals transferred by the conductors in the electrical raft, and around the engine using the electrical rafts/raft assemblies may take any form. For example, the electrical signals may include, by way of non-limitative example, electrical power and/or electrical control/communication signals and/or any other type of transmission through an electrical conductor. Transmission of signals around the engine may mean transmission of signals between (to and/or from) any number of components/systems in the engine and/or components/system of a structure (such as an airframe) to which the gas turbine engine is (or is configured to be) connected/installed in. In other words, an electrical raft may be used to transfer/communicate any possible combination of electrical signals in any part of a gas turbine engine installation or a related (for example electrically and/or mechanically connected) structure/component/system.

A raft or raft assembly may be provided in any suitable location/position of the gas turbine engine, for example to a mounting structure at any suitable location. For example, the gas turbine engine may comprise a bypass flow duct formed between an engine core and an engine fan casing (the gas turbine engine may be a turbofan engine, for example); and the raft assembly may form at least a part of a radially extending splitter (which may be referred to as a bifurcation) that extends across the bypass flow duct. In this way, a raft (which may be referred to as a splitter electrical raft) may provide a connection (for example fluid and/or electrical connection) between a fan casing and an engine core. By way of further example, the electrical raft assembly may be attached to the engine core case or engine fan case, for example to a mounting structure on such cases.

Other components/systems of a gas turbine engine may be provided to a rigid raft in any suitable manner. For example, such other components/systems may be mounted on one or more raft assemblies. Thus, a surface of an electrical raft, for example, may be used as a mounting surface for other gas turbine engine components/systems, such as ancillary/auxiliary components/systems.

For example, as mentioned above, an electrical unit may be mounted on an electrical raft. The electrical unit may be any sort of electrical unit, for example one that may be provided to a gas turbine engine. For example, the electrical unit may be any type of electronic control unit (ECU), such as an Electronic Engine Controller (EEC) and an Engine Health Monitoring Unit (EMU). At least one (i.e. one or more) electrical unit may be attached to an electrical raft. Such an electrical raft assembly may be a particularly convenient, lightweight and/or compact way of providing (for example attaching, fixing or mounting) an electrical unit to a turbine engine. For example, the electrical unit and the electrical raft may be assembled together (mechanically and/or electrically) before being installed on the gas turbine engine, as described elsewhere herein. A raft may comprise some units that are not tethered between the first and second mounts, and some units that are tethered between the first and second mounts.

An anti-vibration mount may be used to attach an raft to another component, including to the engine. Thus, the first mount may be an anti-vibration mount. This may allow the raft to be vibration isolated (or at least substantially vibration isolated). Using an anti-vibration mount to attach an raft/assembly to a gas turbine engine for example may reduce (or substantially eliminate) the amount (for example the amplitude and/or the number/range of frequencies) of vibration being passed to the raft from the gas turbine engine, for example during use. This may help to prolong the life of the raft. Furthermore, any other components that may be attached to the raft (as discussed above and elsewhere herein) may also benefit from being mounted to the gas turbine engine via the anti-vibration mounts, through being mounted on the raft. For example, the reduced vibration may help to preserve the electrical contact between an electrical raft and any electrical unit connected thereto. As such, any components (such as an electrical unit mounted to the electrical raft) that would conventionally be mounted directly to the gas turbine engine and require at least a degree of vibration isolation no longer require their own dedicated anti-vibration mount. Thus, the total number of anti-vibration mounts that are required to assemble an engine may be reduced. This may reduce the number of parts required and/or the time taken to assemble an engine or engine installation and/or reduce the total assembled weight and/or reduce the likelihood of errors occurring during assembly.

Furthermore, components that are conventionally mounted to an engine without anti-vibration mounts (for example because of the weight and/or cost penalty), but which are now mounted to a raft (for example to a mounting surface of the electrical raft), may benefit from vibration isolation without any weight/cost/assembly time penalty. This may reduce the possibility of damage occurring to such components and/or increase their service life. Such components may include, for example, ignitor boxes (used to provide high voltage power to engine ignitors), and pressure sensors/switches, for example for fluid systems such as oil, air, fuel, pneumatics and/or hydraulics.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

Figure 1:
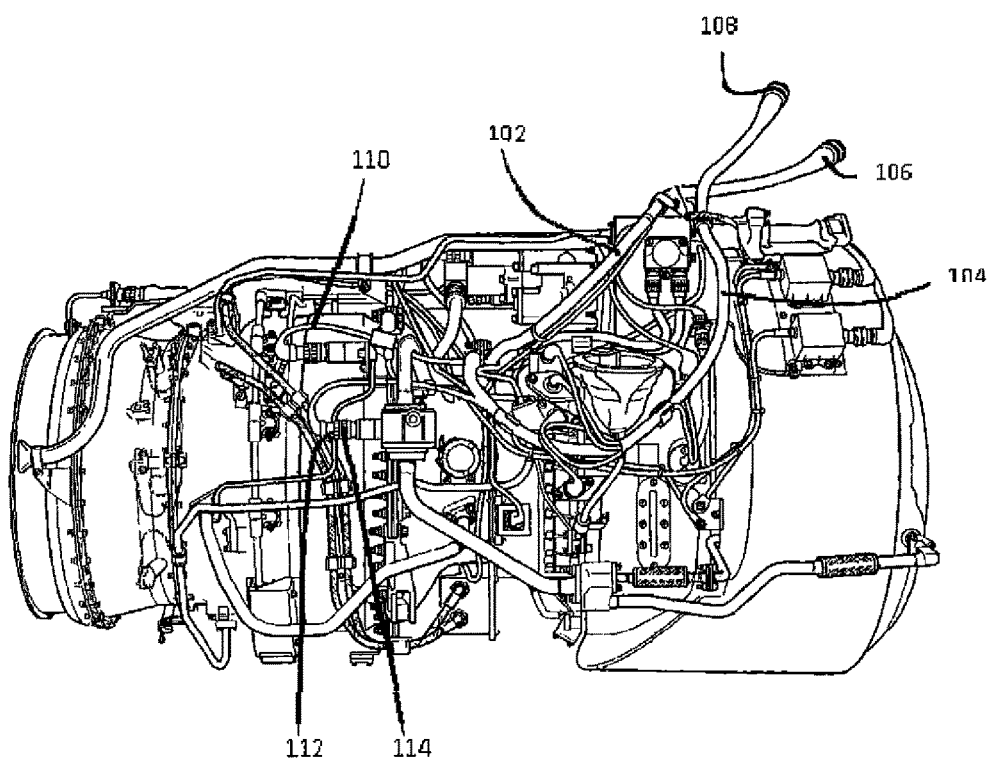
FIG. 1 shows a gas turbine engine with a conventional harness.
Figure 2:
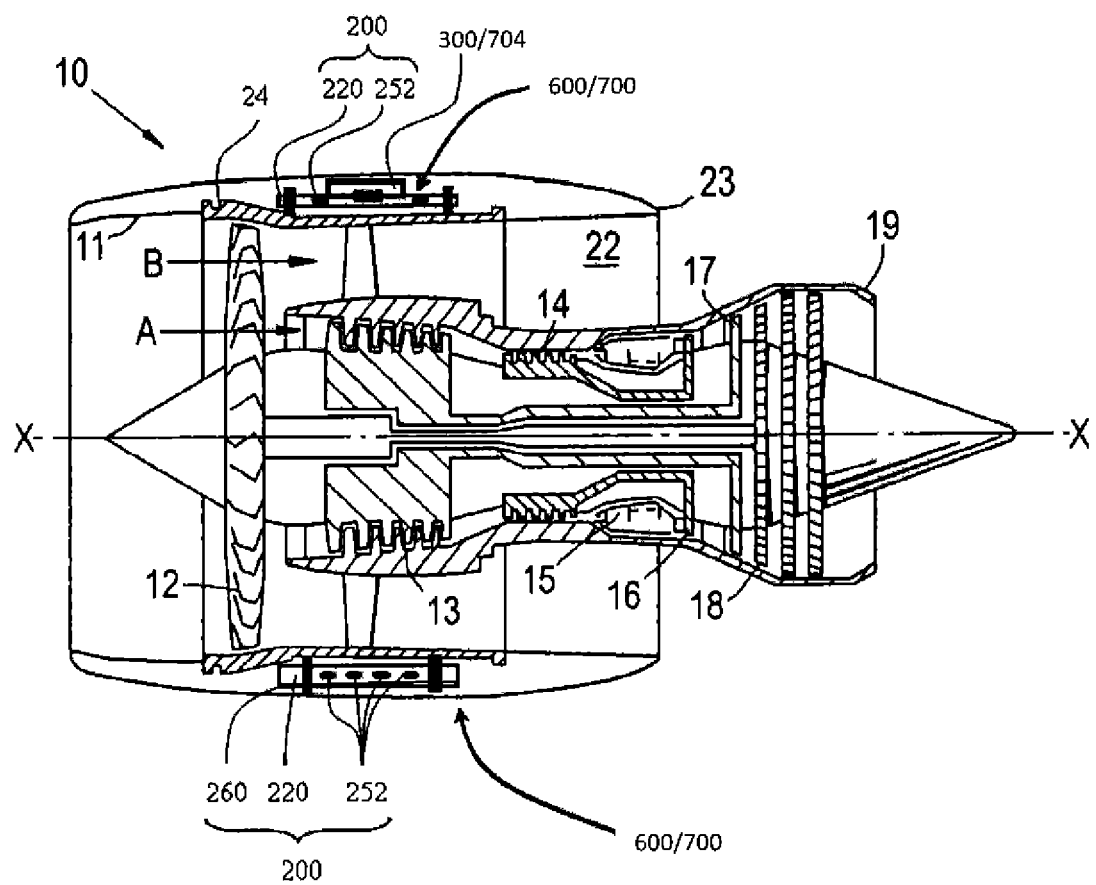
FIG. 2 shows a cross-section through a gas turbine engine in accordance with the present invention.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 2 shows two electrical raft assemblies 600/700 according to the invention. As such, the gas turbine engine 10 is in accordance with the present invention. Each electrical raft assembly 600/700 comprises an electrical raft 200. The electrical rafts 200 may be used to transmit/transfer electrical signals (or electricity, including electrical power and/or electrical control signals) around the engine and/or to/from the engine 10 from other components, such as components of an airframe. The function and/or construction of each electrical raft 200 and electrical raft assembly 600/700 may be as described above and elsewhere herein.

In FIG. 2, each electrical raft 200 (which may be referred to herein simply as a raft 200 or an electrical harness raft 200) comprises at least one electrical conductor 252 embedded in a rigid material 220, which may be a rigid composite material.

It will be appreciated that some rafts may not have electrical conductors 252 embedded therein. For example, some rafts may instead (or additionally) have fluid passages embedded therein, as discussed elsewhere herein. Thus, where the description relates to an "electrical raft" (or similar), it will be appreciated that this description, where compatible, also applies to other sorts of raft.

The electrical conductors 252 in the electrical raft 200 may be provided in a harness 250, which may be a flexible printed circuit board (or FPC) 250.

Figure 3:
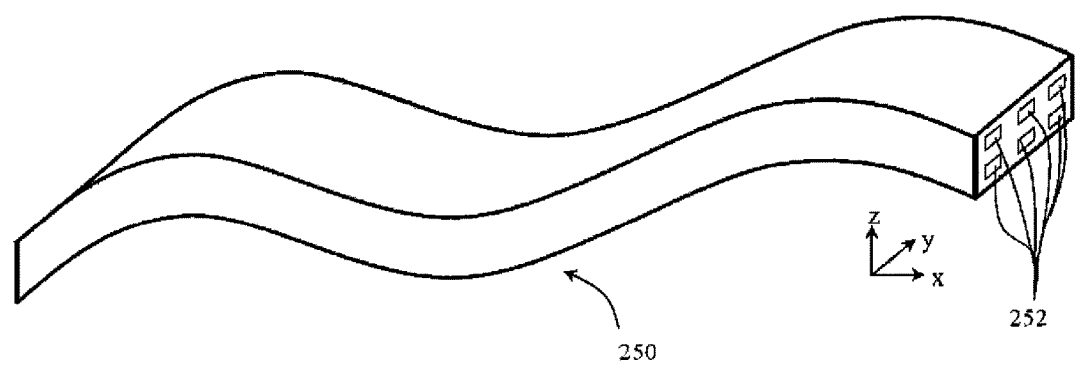
FIG. 3 shows a perspective view of a flexible printed circuit.
Figure 4:
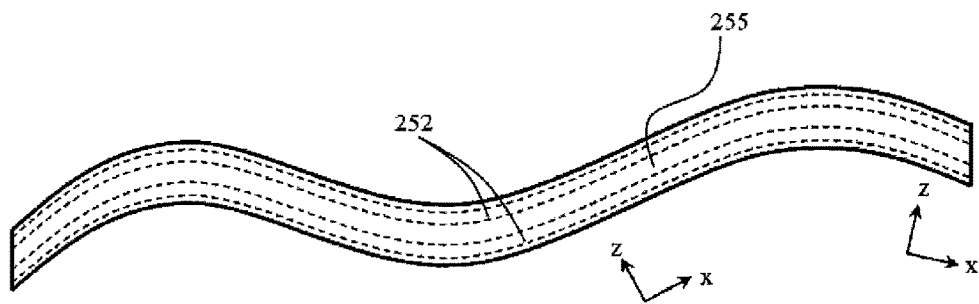
FIG. 4 shows a side view of the flexible printed circuit of FIG. 3.

An example of an FPC 250 in which the electrical conductors 252 may be provided is shown in greater detail in FIGS. 3 and 4. FIG. 3 shows a perspective view of the FPC 250, and FIG. 4 shows a side view.

Such an FPC 250 may comprise a flexible (for example elastically deformable) substrate 255 with conductive tracks 252 laid/formed therein. The FPC 250 may thus be deformable. The FPC 250 may be described as a thin, elongate member and/or as a sheet-like member. Such a thin, elongate member may have a major surface defined by a length and a width, and a thickness normal to the major surface. In the example shown in FIGS. 3 and 4, the FPC 250 may extend along a length in the x-direction, a width in the y-direction, and a thickness (or depth or height) in the z-direction. The x-direction may be defined as the axial direction of the FPC. Thus, the x-direction (and thus the z-direction) may change along the length of the FPC 250 as the FPC is deformed. This is illustrated in FIG. 4. The x-y surface(s) (i.e. the surfaces formed by the x and y directions) may be said to be the major surface(s) of the FPC 250. In the example shown in FIGS. 3 and 3, the FPC 250 is deformable at least in the z direction, i.e. in a direction perpendicular to the major surface. FPCs may be additionally of alternatively deformable about any other direction, and/or may be twisted about any one or more of the x, y, or z directions.

The flexible substrate 255 may be a dielectric. The substrate material may be, by way of example only, polyamide. As will be readily apparent, other suitable substrate material could alternatively be used.

The conductive tracks 252, which may be surrounded by the substrate 255, may be formed using any suitable conductive material, such as, by way of example only, copper, copper alloy, tin-plated copper (or tin-plated copper alloy), silver-plated copper (or silver-plated copper alloy), nickel-plated copper (or nickel-plated copper alloy) although other materials could alternatively be used. The conductive tracks 252 may be used to conduct/transfer electrical signals (including electrical power and electrical control signals) through the rigid raft assembly (or assemblies) 200, for example around a gas turbine engine 10 and/or to/from components of a gas turbine engine and/or an airframe attached to a gas turbine engine.

The size (for example the cross-sectional area) and/or the shape of the conductive tracks 252 may depend on the signal(s) to be transmitted through the particular conductive track 252. Thus, the shape and/or size of the individual conductive tracks 252 may or may not be uniform in a FPC 250.

The example shown in FIGS. 3 and 4 has six conductive tracks 252 running through the substrate 255. However, the number of conductive tracks 252 running through a substrate 255 could be fewer than six, or greater than six, for example tens or hundreds of tracks, as required. As such, many electrical signals and/or power transmission lines may be incorporated into a single FPC 250.

A single FPC 250 may comprise one layer of tracks, or more than one layer of tracks, for example, 2, 3, 4, 5, 6, 7, 8, 9, 10 or more than 10 layers of tracks. An FPC may comprise significantly more than 10 layers of tracks, for example at least an order of magnitude more layers of tracks. In this regard, a layer of tracks may be defined as being a series of tracks that extend in the same x-y surface. Thus, the example shown in FIGS. 3 and 4 comprises 2 layers of tracks, with each layer comprising 3 tracks 252.

An electrical raft 200 may be manufactured using any suitable method. For example, the rigid material 220 may initially be provided as layers of flexible material, such as (by way of example only) layers of fibre and resin compound. This flexible material may be placed into a mould, for example having a desired shape. Other components (such as fluid pipes 210 and/or the electrical conductors 252, which may be embedded in a FPC 250) may also be placed into the mould, for example between layers of the flexible material from which the rigid material 220 is ultimately formed. Parts of the mould may have any suitable form and/or construction, for example that could be readily removed when the electrical raft 200 is formed into the desired shape.

Figure 5:
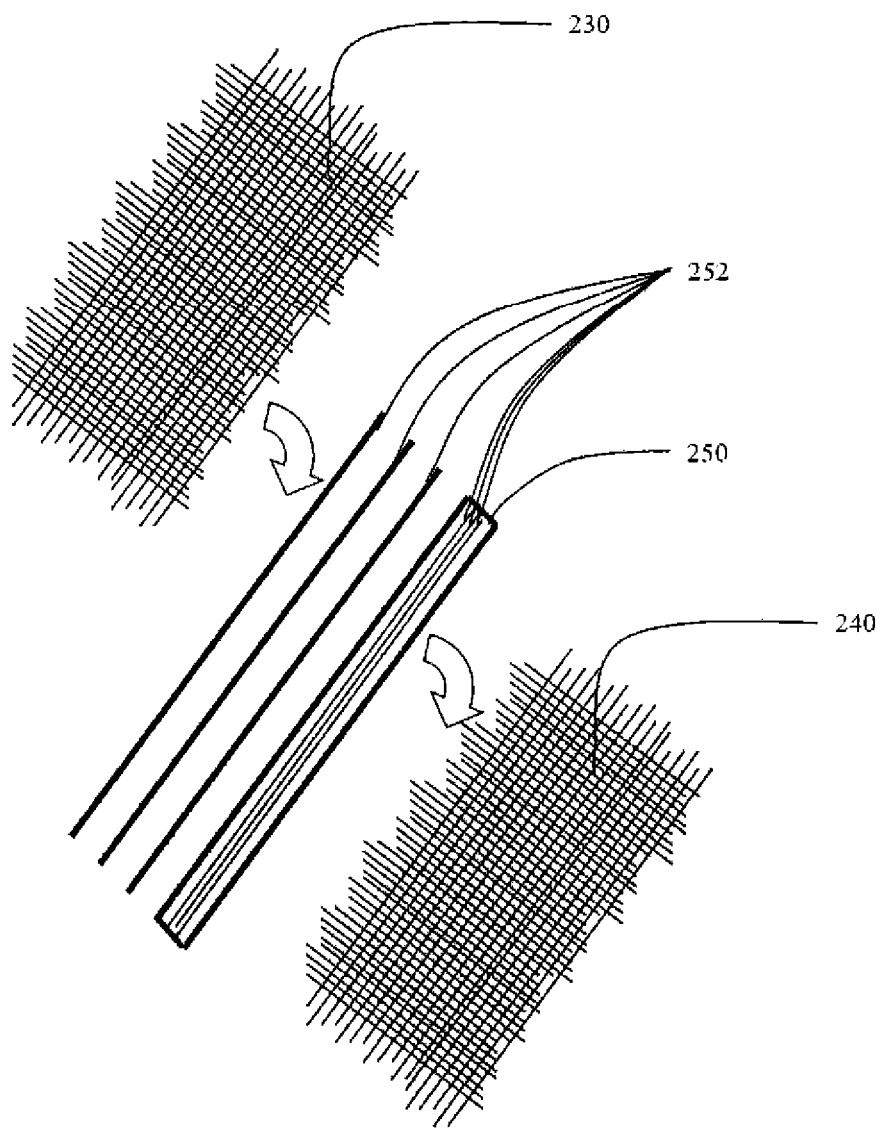
FIG. 5 shows a schematic of an electrical raft prior to assembly.

FIG. 5 shows components of an example of an electrical raft 200 prior to one method of construction. The electrical conductors 252 are provided between two layers of material 230, 240 that, after construction, form the rigid material 220. Some of the electrical conductors 252 are provided in an FPC 250. The material 230, 240 may be a fibre and resin compound, as described elsewhere herein. Such a fibre and resin compound may, after suitable treatment (for example heat treatment), produce the rigid composite material 220. In the example of FIG. 5, the fibre and resin compound is formed of a sheet of interwoven fibres, or strands. The strands in FIG. 5 extend in perpendicular directions, although the strands may extend in any one or more directions as required. The strands/fibres may be pre-impregnated (or "pre-pregged") with the resin.

Prior to any treatment, both the first and second layers 230, 240 and the electrical conductors 252 may be flexible, for example supple, pliable or malleable. As such, when the layers 230, 240 and the electrical conductors 252 are placed together, they may be moulded, or formed, into any desired shape. For example, the layers 230, 240 and the electrical conductors 252 may be placed into a mould (which may be of any suitable form, such as a glass or an aluminium mould) having the desired shape. The desired shape may be, for example, a shape that corresponds to (for example is offset from) a part of a gas turbine engine, such as, by way of example only, at least a part of a casing, such as an engine fan casing or engine core casing. This may enable the final raft to adopt shapes that are curved in two-dimensions or three-dimensions.

Any suitable method could be used to produce the electrical raft 200. For example, the strands/fibres need not be pre-impregnated with the resin. Instead, the fibres/strands could be put into position (for example relative to electrical conductors 252/FPC 250) in a dry state, and then the resin could be fed (or pumped) into the mould. Such a process may be referred to as a resin transfer method. In some constructions no fibre may be used at all in the rigid material 220.

Figure 6:
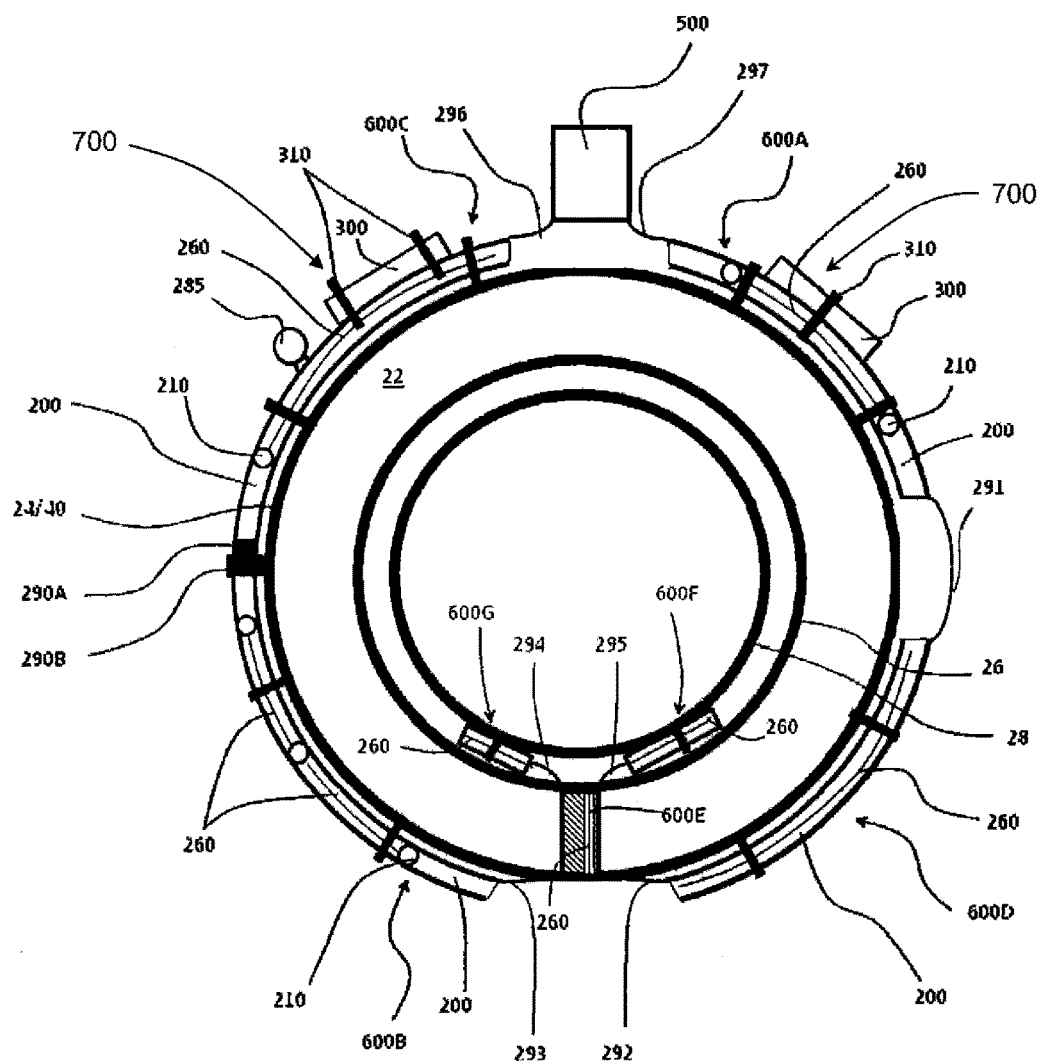
FIG. 6 shows a cross-section normal to the axial direction through a gas turbine engine in accordance with the present invention.

FIG. 6 is a schematic showing a cross-section perpendicular to the axial direction X-X of a gas turbine engine comprising electrical raft assemblies 600A-600G. Any one of the electrical raft assemblies 600A-600G may comprise any or all of the features of an electrical raft assembly 600 as described above, for example. Thus, for example, any one of the electrical raft assemblies may comprise an electrical raft 200 (not labelled for raft assemblies 600E-600G for simplicity only) having electrical conductors 252 (not labelled in FIG. 6 for simplicity only) embedded therein. Some or all of the electrical raft assemblies 600A-600G (which may collectively be referred to as electrical raft assemblies 600) comprise a component/unit mounted thereon and tethered using an embedded tether, and may thus be raft assemblies 700 in accordance with an aspect of the invention (as described in more detail below in relation to FIGS. 7 and 8). In FIG. 6, for example, the raft assemblies 600A and 600C are provided with an electrical unit 300 mounted thereon. The electrical unit 300 is an example of such a component/unit 704 described in relation to FIGS. 7 and 8, and thus the raft assemblies 600A, 600C are raft assemblies in accordance with an aspect of the invention, labelled 700 in FIGS. 7 and 8.

The rafts are mounted to a fan case 24 for electrical raft assemblies 600A-600D, to a bifurcation splitter that radially crosses a bypass duct 22 for electrical raft assemblies 600E and to part of an engine core case 28 for electrical raft assemblies 600F and 600G. However, it will be appreciated that an electrical raft assembly 600 could be mounted in any suitable and/or desired location on a gas turbine engine.

As mentioned herein, each of the electrical rafts 200 associated with the electrical raft assemblies 600A-600G shown in FIG. 6 comprises one or more electrical conductors 252 embedded therein. However, any one or more of the electrical rafts 200 may be replaced with a raft that does not comprise electrical conductors 252. Such a raft would not be an electrical raft 200, but may otherwise be as described elsewhere herein, for example it may be a rigid raft that may have components/systems (such as, by way of example only, fluid systems, such as pipes) mounted thereon and/or embedded therein. Thus, for example, a gas turbine engine in accordance with the present invention may have a combination of electrical rafts 200 and non-electrical rafts.

The arrangement of electrical raft assemblies 600A-600G shown in FIG. 6 is by way of example only. Alternative arrangements, for example in terms of number, size, shape and/or positioning, of electrical raft assemblies 600A-600G may be used. For example, there need not be seven electrical raft assemblies, the assemblies may or may not be connected together, and the rafts could be provided to (for example mounted on) any one or more components of the gas turbine engine. Purely by way of example only, connection between electrical raft assemblies 600A-600D mounted on the fan casing 24 to the electrical raft assemblies 600F, 600G mounted on the core casing 28 may be provided at least in part by means other than an additional electrical raft assembly 600E, for example using wire conductors with insulating sleeves. By way of further example, one or more electrical raft assemblies 600 may additionally or alternatively be provided to the nose cone, structural frames or elements within the engine (such as "A-frames"), the nacelle, the fan cowl doors, and/or any connector or mount between the gas turbine engine 10 and a connected structure (which may be at least a part of a structure in which the gas turbine engine 10 is installed), such as the pylon 500 between the gas turbine engine 10 and an airframe (not shown).

Any one or more of the electrical rafts of the raft assemblies 600A-600G may have a fluid passage 210 embedded therein and/or provided thereto. The fluid passage 210 may be part of a fluid system, such as a gas (for example pneumatic or cooling gas/air) and/or liquid (for example a fuel, hydraulic and/or lubricant liquid). In the FIG. 6 example, three of the electrical rafts (of electrical raft assemblies 600A, 600B, 600C) comprise a fluid passage 210 at least partially embedded therein. The electrical raft of assembly 600C also has a fluid passage 285 (which may be for any fluid, such as those listed above in relation to embedded passage 210) mounted thereon. Such a mounted fluid passage 285 may be provided to any electrical raft, such as those of electrical raft assemblies 600A-600G shown in FIG. 6. The fluid passages 210, 285 shown in FIG. 6 may be oriented in an axial direction of the engine 10. However, fluid passages may be oriented in any direction, for example axial, radial, circumferential or a combination thereof.

Any of the electrical raft assemblies 600A-600G (or the respective electrical rafts 200 thereof) may have any combination of mechanical, electrical and/or fluid connections to one or more (for example 2, 3, 4, 5 or more than 5) other components/systems of the gas turbine engine 10 and/or the rest of the gas turbine engine 10. Examples of such connections are shown in FIG. 6, and described below, but other connectors may be used. For example, electrical raft assemblies 600 (and/or non-electrical rafts) may be connected together (or to other components) using any combination of electrical, fluid and/or mechanical connectors. Thus, any of the connections 290A/290B, 291-297 shown in FIG. 6 may be any combination of electrical, fluid and/or mechanical connection. Alternatively, electrical raft assemblies 600 (and/or non-electrical rafts) may be standalone, and thus may have no connection to other rafts or components.

A connection 291 is shown between the electrical rafts of the assemblies 600A and 600D. The connection 291 may comprise an electrical connection. Such an electrical connection may be flexible and may, for example, take the form of a flexible printed circuit such as the flexible printed circuit 250 shown in FIGS. 3 and 4. Such a flexible electrical connection may be used to electrically connect any electrical raft assembly 600 to any other component, such as another electrical raft assembly 600. A connection 297 (which may be or comprise an electrical connection) is provided between the electrical raft of the assembly 600A and a part of an airframe, or airframe installation 500, which may, for example, be a pylon. Similarly, a fluid and/or mechanical connection 296 may additionally or alternatively be provided between the airframe 500 and another electrical raft of the assembly 600C. As shown in FIG. 6, other electrical and/or fluid connections 292, 293, 294, 295 may be provided between electrical rafts 200 (or assemblies 600) and other components, such as other electrical rafts 200 (or assemblies 600).

A direct connection 290A, 290B may be provided, as shown for example between the electrical rafts of the assemblies 600B and 600C in the FIG. 6 arrangement. Such a direct connection 290A, 290B may comprise a connector 290A provided on (for example embedded in) one electrical raft 200 connected to a complimentary connector 290B provided on (for example embedded in) another electrical raft 200. Such a direct connection 290A, 290B may, for example, provide fluid and/or electrical connection between the two electrical rafts assemblies 600B, 600C.

An electrical raft 200 may have an electrically conductive grounding or screen layer 260, as shown in the electrical rafts 200 shown in FIG. 6. However, it will be appreciated that electrical rafts 200 according to the invention and/or for use with the invention need not have such an electrically conductive grounding or screen layer 260. Where an electrically conductive grounding or screen layer 260 is present, an electrically conductive fastener 310 may be used to fasten, or fix, the electrical unit 300 (where present) to the electrical raft 200. This may allow the electrical unit 300 to be electrically grounded. It will also be appreciated, however, that electrical rafts 200 according to the invention and/or for use with the invention need not have such an electrically conductive fastener 310.

It will be appreciated that many alternative configurations and/or arrangements of rafts and raft assemblies and gas turbine engines 10 comprising such rafts/raft assemblies other than those described herein may fall within the scope of the invention. For example, alternative arrangements of electrical raft assemblies 600 (for example in terms of the arrangement, including number/shape/positioning/constructions, of mounting fixtures, the arrangement/shape/positioning/construction of the electrical rafts 200, the type and/or positioning of components (if any) mounted to/embedded in the electrical rafts 200, the rigid material 220 and the electrical conductors 252) may fall within the scope of the invention and may be readily apparent to the skilled person from the disclosure provided herein. Alternative arrangements of connections (for example mechanical, electrical and/or fluid) between the electrical (or non-electrical) rafts and/or raft assemblies and between the electrical (or non-electrical) rafts or raft assemblies and other components may fall within the scope of the invention and may be readily apparent to the skilled person from the disclosure provided herein.

Figure 7:
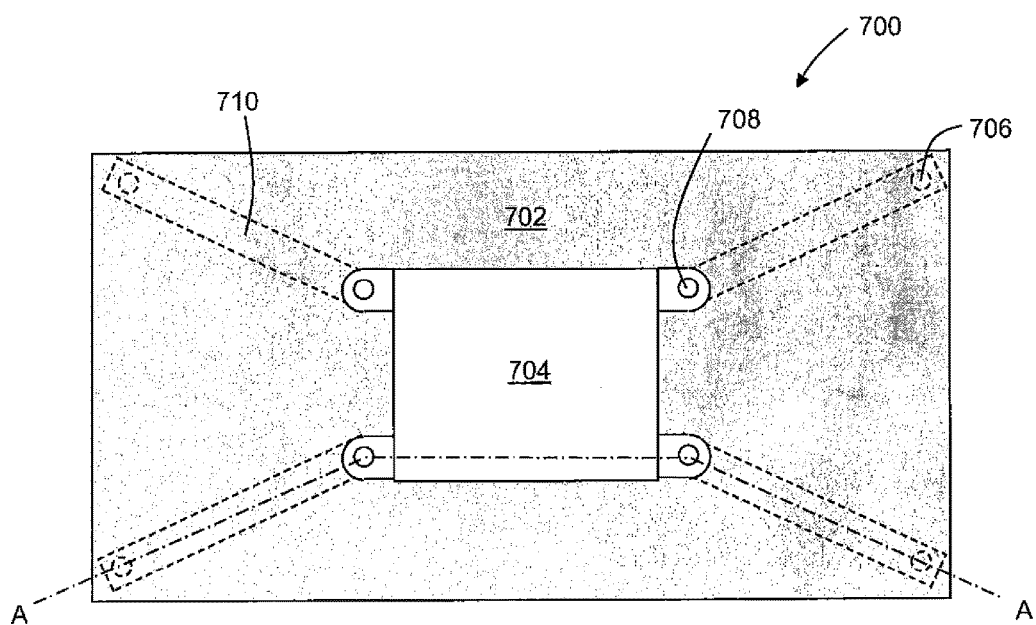
FIG. 7 shows a schematic plan view of a rigid raft assembly in which an engine component is mounted to a rigid raft.
Figure 8:
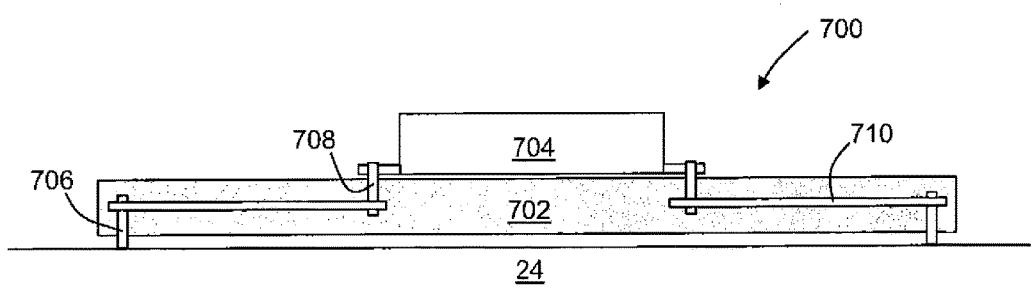
FIG. 8 shows a schematic cross-section of the assembly of FIG. 7 along dashed line A-A.

FIG. 7 shows a schematic plan view of a rigid raft assembly 700 in which an engine component 704 (which may be an electrical unit 300, as described herein in relation to FIGS. 2 and 6, for example) is mounted to a rigid raft 702 (which may be a rigid electrical raft 200, as described in relation to FIGS. 2 and 6, for example), and FIG. 8 shows a schematic cross-section of the assembly of FIG. 7 along dot-dashed line A-A. In FIG. 7, embedded elements of the assembly are indicated by dashed outlines. The raft assembly 700 may have the position, structure and features of any one of the rafts or raft assemblies described above in relation to FIGS. 2 to 6. For example, the raft can include an electrical system comprising electrical conductors in the form of PCB layers sandwiched between layers of carbon fibre reinforced polymer matrix composite material.

The raft 702 is mounted for example to a fan case 24 of the engine at a plurality of first mounts 706, which may be in the form of metallic brackets partly embedded in the raft and partly protruding from the side of the raft adjacent the case.

The raft 702 also has a plurality of second mounts 708, which may also be in the form of metallic brackets. These are also partly embedded in the raft, but partly protruding from the side of the raft away from the case 24. The engine component 704 is attached to the raft by the second mounts.

In the event of a fire or an overheat event, the polymer matrix of the composite material of the raft 702 can soften and lose mechanical integrity. It could exacerbate the seriousness of the event if, as a result of this loss of integrity, the engine component 704 were to come loose, potentially damaging the component or other parts of the engine. To avoid such an occurrence, the raft includes tethers 710 which are embedded in the material of the raft and extend between respective first 706 and second 708 mounts. The joints between the tethers and the mounts are embedded in the raft.

The tethers 710 are typically metallic, and can be in the form of strips (as shown in FIGS. 7 and 8) or rods. However, as the tethers are only needed to limit movement of the component 704 when the material of the raft 702 loses its strength, they can also be flexible members, such as braids.

Advantageously, by embedding the tethers 710 in the raft 702, e.g. during the manufacture of the raft, they can be "fitted and forgotten". Located within the raft, there is no risk that the tethers can be left off during original build or maintenance, and they do not need to be inspected. They also protected damage during service.

While the invention has been described in conjunction with the exemplary embodiments described above, many equivalent modifications and variations will be apparent to those skilled in the art when given this disclosure. For example, although the mounts 706, 708 and tethers 710 are shown in FIGS. 7 and 8 as separate joined components, each tether can be formed with integral mounts. Accordingly, the exemplary embodiments of the invention set forth above are considered to be illustrative and not limiting. Various changes to the described embodiments may be made without departing from the spirit and scope of the invention. Furthermore, any feature described and/or claimed herein may be combined with any other compatible feature described in relation to the same or another embodiment.

Where reference is made herein to a gas turbine engine, it will be appreciated that this term may include a gas turbine engine/gas turbine engine installation and optionally any peripheral components to which the gas turbine engine may be connected to or interact with and/or any connections/interfaces with surrounding components, which may include, for example, an airframe and/or components thereof. Such connections with an airframe, which are encompassed by the term "gas turbine engine" as used herein, include, but are not limited to, pylons and mountings and their respective connections. The gas turbine engine itself may be any type of gas turbine engine, including, but not limited to, a turbofan (bypass) gas turbine engine, turbojet, turboprop, ramjet, scramjet or open rotor gas turbine engine, and for any application, for example aircraft, industrial, and marine application. Rafts and/or raft assemblies such as any of those described and/or claimed herein may be used as part of any apparatus, such as any vehicle, including land, sea, air and space vehicles, such as motor vehicles (including cars and busses), trains, boats, submarines, aircraft (including aeroplanes and helicopters) and spacecraft (including satellites and launch vehicles).

We claim:

1. A rigid raft for a gas turbine engine, comprising:
   an electrical system embedded in material of the rigid raft, the electrical system comprising electrical conductors that are embedded in the material of the rigid raft so as to be surrounded by, in direct contact with, and fixed in position by the material of the rigid raft;
   one or more first mounts for mounting the rigid raft to the gas turbine engine, and one or more second mounts for mounting a gas turbine engine component to the rigid raft; and
   one or more tethers, each of which (i) extends between, and is directly connected to, one of the first mounts and one of the second mounts and (ii) is embedded in the material of the rigid raft so as to be surrounded by, in direct contact with, and fixed in position by the material of the rigid raft.

2. The rigid raft according to claim 1, wherein the rigid raft is formed of composite material.

3. The rigid raft according to claim 1, wherein at least one of the one or more tethers is metallic.

4. The rigid raft according to claim 1, wherein at least one of the one or more first and second mounts is at least partially embedded in the rigid raft.

5. The rigid raft according to claim 1, wherein at least one of the one or more first and second mounts is metallic.

6. A rigid raft assembly for the gas turbine engine, the rigid raft assembly including:
   the rigid raft according to claim 1; and
   the gas turbine engine component mounted to the rigid raft by at least one of the one or more second mounts.

7. The gas turbine engine or gas turbine engine installation, having the rigid raft assembly according to claim 6.

8. The gas turbine engine or gas turbine engine installation, having the rigid raft assembly according to claim 6.

9. The gas turbine engine or the gas turbine engine installation according to claim 7, wherein:
   the rigid raft is a first engine installation component,
   the gas turbine engine or the gas turbine engine installation further comprises a second engine installation component having electrical conductors, and
   at least one flexible cable connects between the rigid raft and the second engine installation component so as to electrically connect the electrical conductors of the rigid raft with the electrical conductors of the second engine installation component.

10. The rigid raft for the gas turbine engine according to claim 1, further comprising a fluid system embedded in the material of the rigid raft.

* * * * *